United States Patent
Kawano et al.

(10) Patent No.: US 6,992,660 B2
(45) Date of Patent: Jan. 31, 2006

(54) INFORMATION PROCESSING APPARATUS, PROGRAM AND COORDINATE INPUT METHOD

(75) Inventors: Seiichi Kawano, Sagamihara (JP); Masayoshi Nakano, Machida (JP); Yuhko Ohmori, Sagamihara (JP)

(73) Assignee: Lenovo (Singapore) Pte Ltd, Singapore (SG)

( * ) Notice: Subject to any disclaimer, the term of this patent is extended or adjusted under 35 U.S.C. 154(b) by 275 days.

(21) Appl. No.: 10/300,065

(22) Filed: Nov. 20, 2002

(65) Prior Publication Data

US 2003/0095112 A1 May 22, 2003

(30) Foreign Application Priority Data

Nov. 22, 2001 (JP) ............................. 2001-357653

(51) Int. Cl.
G09G 5/00 (2006.01)
(52) U.S. Cl. .................... 345/173; 178/18.01
(58) Field of Classification Search ........ 345/173–178; 178/18.01, 18.03, 20.01; D14/389
See application file for complete search history.

(56) References Cited

U.S. PATENT DOCUMENTS

| | | | | |
|---|---|---|---|---|
| 5,825,352 A | * | 10/1998 | Bisset et al. ................ | 345/173 |
| 5,943,043 A | * | 8/1999 | Furuhata et al. ............ | 345/173 |
| 6,590,567 B1 | * | 7/2003 | Nagao et al. ............... | 345/173 |

* cited by examiner

*Primary Examiner*—Bipin Shalwala
*Assistant Examiner*—Tom Sheng
(74) *Attorney, Agent, or Firm*—Joselyn G. Cockburn

(57) ABSTRACT

An apparatus, program product and method of detecting, within a predetermined time period after an input of a first coordinate, an input of a second coordinate being apart a predetermined distance or more from a first coordinate, or detecting, within a predetermined time period after an input of the first coordinate, an input of the second coordinate being apart a predetermined distance or more from the first coordinate and the following input of a third coordinate near the first coordinate, whereby a first processing in accordance with the first coordinate or a second processing in accordance with the first coordinate is performed depending on the detected result.

13 Claims, 7 Drawing Sheets

[Figure 1]
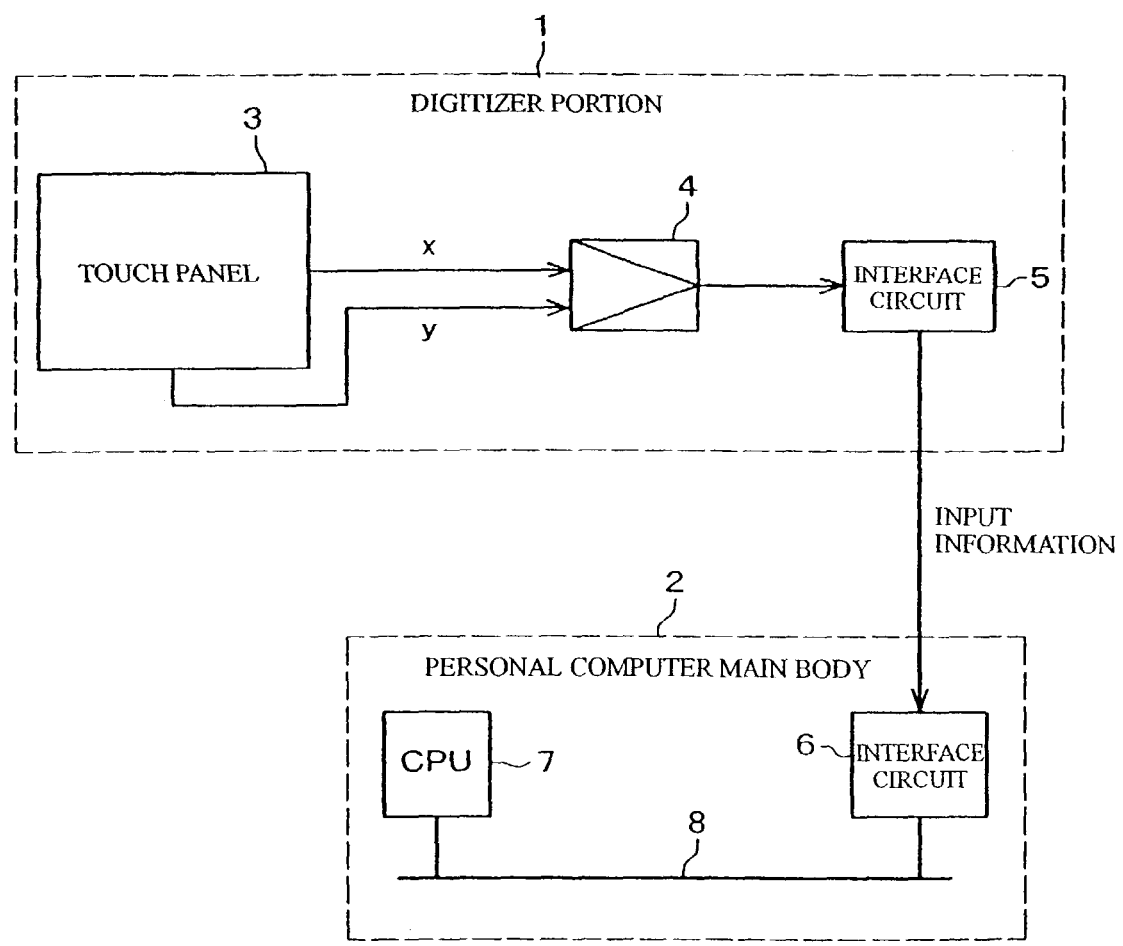

[Figure 2]
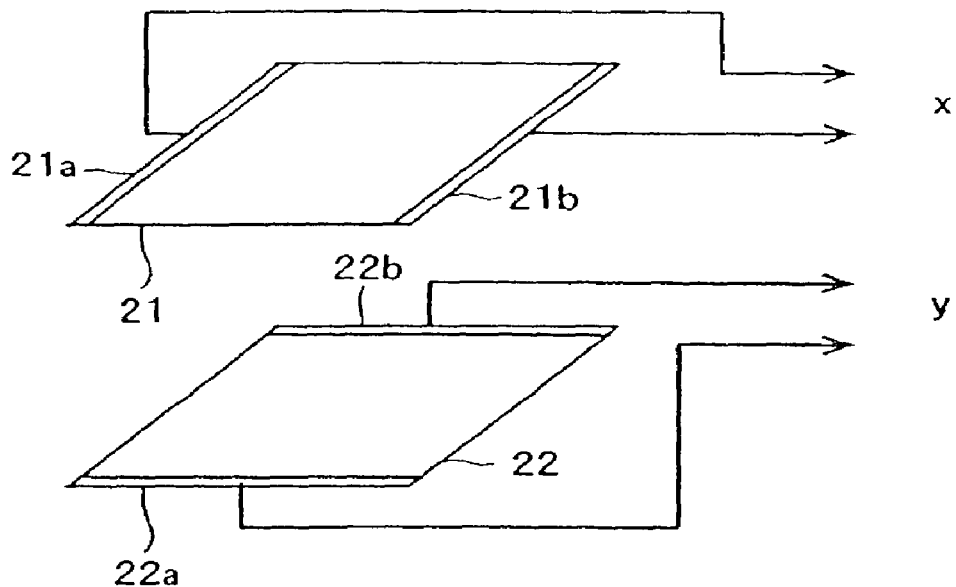
[Figure 3]
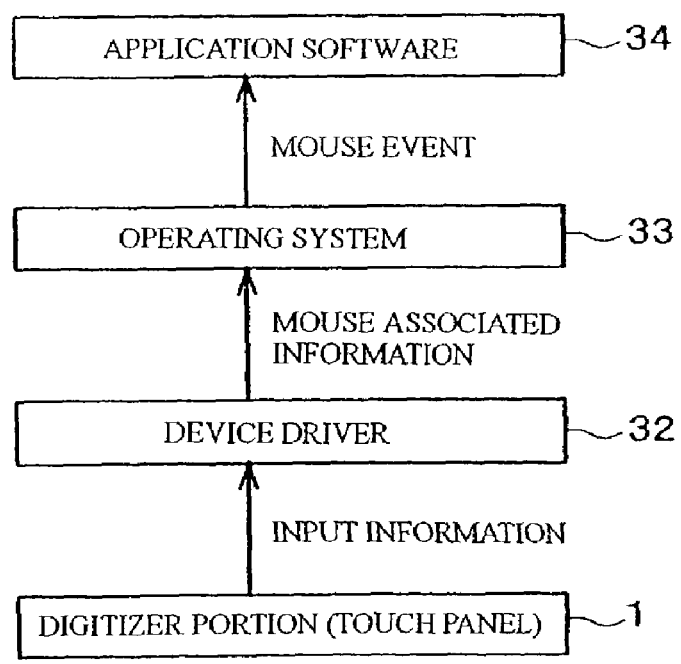

[Figure 4]
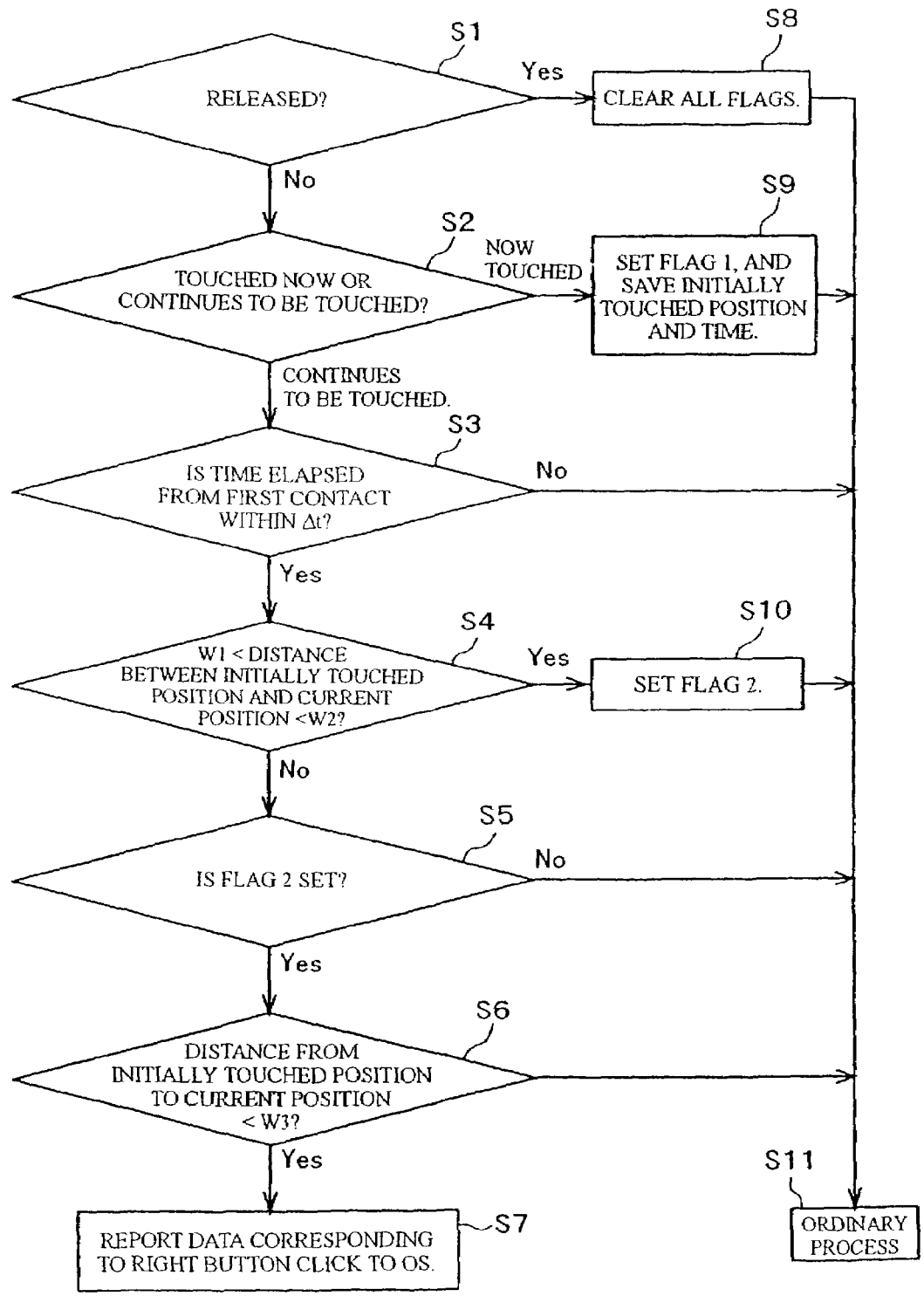

[Figure 5]
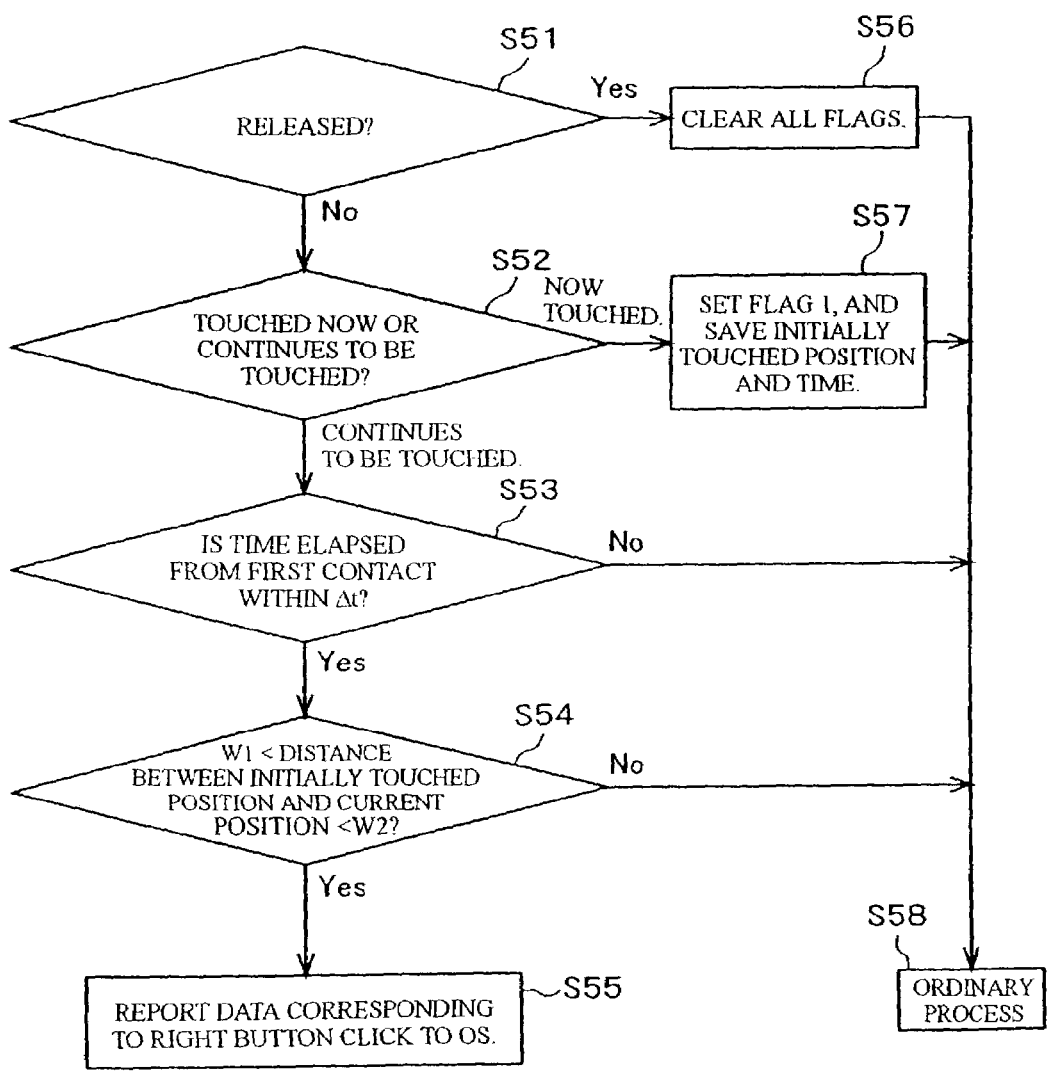

[Figure 6]
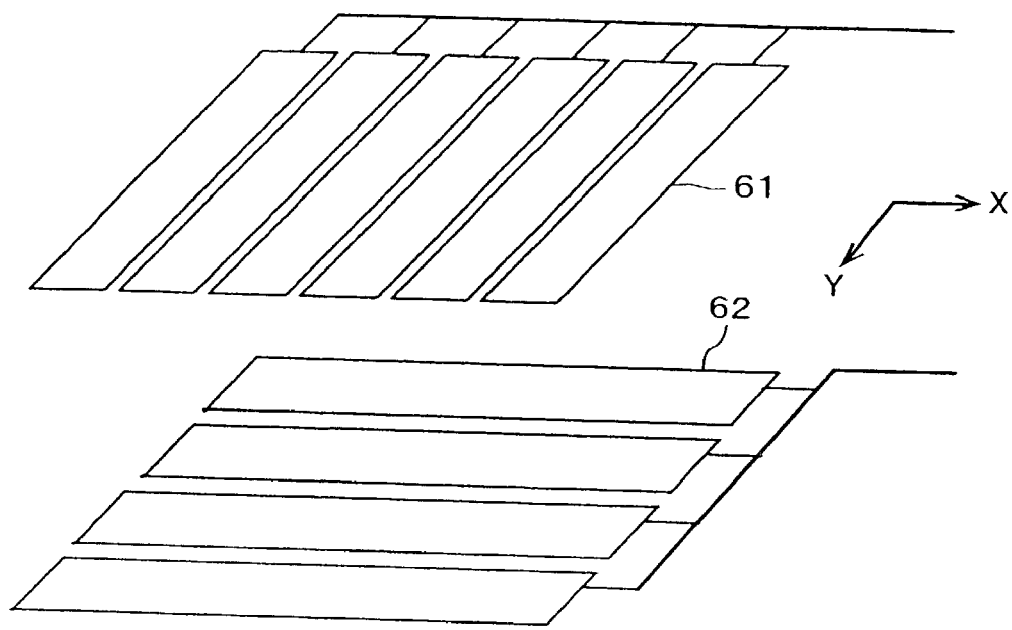
[Figure 7]
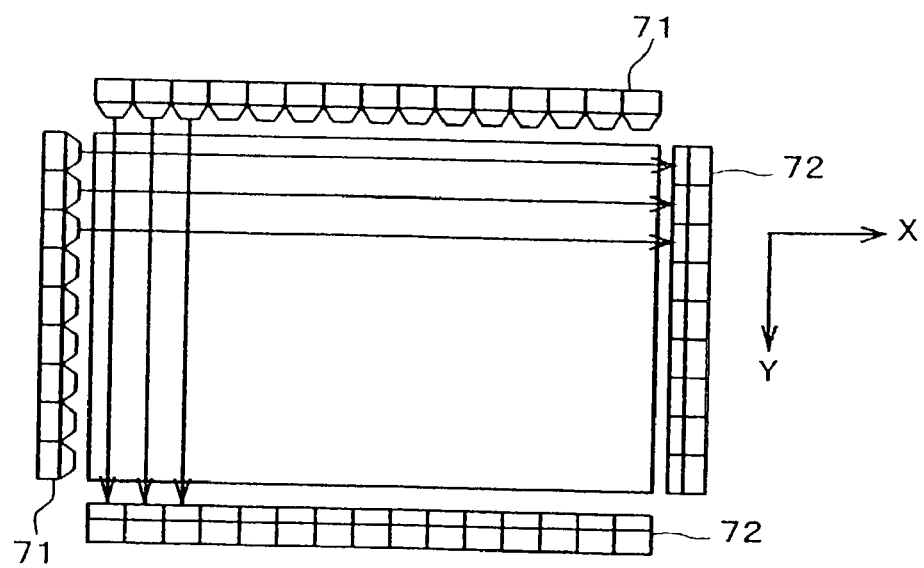

[Figure 8]
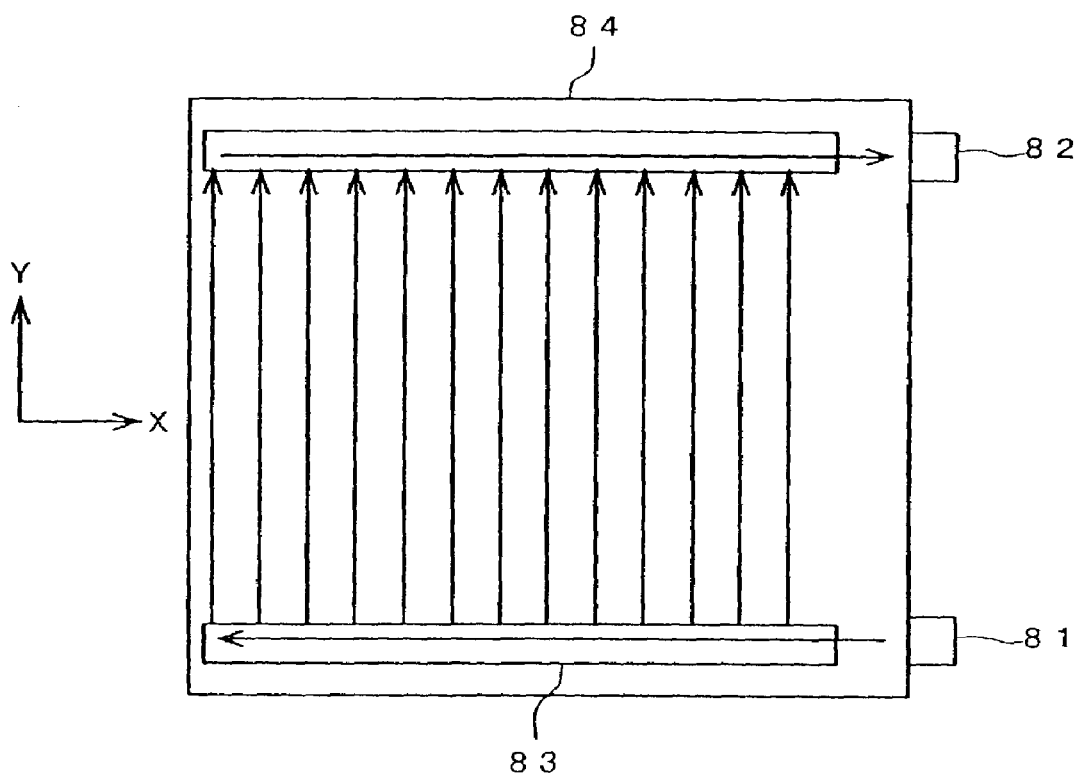

[Figure 9]

| SYSTEM | INPUT COORDINATES WHEN TOUCHING ON PLURAL POINTS | RESOLUTION | OTHER FEATURES |
|---|---|---|---|
| MATRIX | DEPENDENT ON CONTROLLER | LOW | CALIBRATION UNNECESSARY, STRONG TO FLAW |
| OPTICAL SCAN | DEPENDENT ON CONTROLLER | LOW | CALIBRATION UNNECESSARY, STRONG TO FLAW |
| CAPACITIVE COUPLING | MIDDLE POINT | HIGH | ONLY TOUCH, SPECIAL PEN REQUIRED, STRONG TO FLAW |
| SURFACE ACOUSTIC WAVE | DEPENDENT ON CONTROLLER | HIGH | ONLY TOUCH, SPECIAL PEN REQUIRED, STRONG TO FLAW |

INFORMATION PROCESSING APPARATUS, PROGRAM AND COORDINATE INPUT METHOD

FIELD AND BACKGROUND OF INVENTION

The present invention relates to an information processing apparatus for making an information processing in accordance with an input coordinate, a program that can be executed on a computer to perform the information processing in accordance with the input coordinate, and a coordinate input method of inputting the coordinate into the information processing apparatus to perform the information processing in accordance with the input coordinate.

Generally, in a personal computer having a touch panel, a tap operation on the touch panel is handled as the same operation as a left button click of a mouse. Therefore, the selection of an object, or the execution of a program can be simply effected only by tapping on the touch panel. However, conventionally, in the case where there is a desire to make the same processing as a right button click of mouse with an operation of the touch panel, it is required to change beforehand the settings such that the tap operation is handled as the right button click. Thereafter, in the case where there is a desire to make the same processing as the left button click of mouse, it is required again to change the settings such that the tap operation is handled as the left button click. In order to appropriately switch between a processing corresponding to the left button click of mouse and a processing corresponding to the right button click, using the tap operation, it is required to change the settings every time.

Thus, to switch between those processings without need of changing the settings, a touch panel system was proposed in Japanese Published Unexamined Patent Application No. 2000-181630 in which if a position instruction for a second coordinate position is made while a first coordinate position is kept in touch on the touch panel, a processing equivalent to the right button click of mouse is effected. Herein, the position instruction means that the position is not only simply contacted but also the coordinate of that position is entered and detected. Accordingly, in a technique proposed in the above patent, it is a requirement for making the processing corresponding to the right button click that the input of the first coordinate position and the input of the second coordinate position are performed at the same time, and detected.

However, with this conventional technique, since the simultaneous input of the first and second coordinate positions is a requirement for making the processing corresponding to the right button click, the touch panel must be capable of accepting the input of two different points at the same time to input the coordinates to effect the processing corresponding to the right button click. Accordingly, a cheap pressure sensitive touch panel capable of inputting a single coordinate at the same time can not be employed, and an expensive touch panel of surface acoustic wave method capable of inputting a plurality of coordinates at the same time must be employed.

SUMMARY OF THE INVENTION

The present invention has been achieved in the light of the above-mentioned problems with the prior art, and it is a purpose of the invention to provide a technique for easily switching between the different processings in accordance with the input coordinate without changing the settings beforehand, even when coordinate input means is only capable of inputting the coordinate of a single point at the same time.

In order to attain the above purpose, an information processing apparatus according to the present invention: includes means for detecting an input of coordinate; means for performing a first processing in accordance with a first coordinate if the detecting means does not detect the input of coordinate; and means for performing a second processing different from the first processing in accordance with a first coordinate if the detecting means detects the input of coordinate. And the detecting means makes a first type determination of detecting, within a predetermined time period after an input of a first coordinate, an another input of a second coordinate being apart a predetermined distance or more from the first coordinate, or a second type determination of detecting, within a predetermined time period after an input of a first coordinate, an input of a second coordinate being apart a predetermined distance or more from the first coordinate and the following input of a third coordinate near the first coordinate.

Herein, the category of information processing apparatus includes various types of computers, such as a desktop personal computer, a notebook personal computer, a mobile computer, and a workstation.

It is required that the second coordinate is apart a predetermined distance or more from the first coordinate, and input within a predetermined time period after the input of the first coordinate, in which the predetermined distance and the predetermined time period are set up in consideration of the clear distinction from the inputs for other purposes, and the easier and quicker way of input. The inputs for other purposes involve keeping the touch on an object and sliding one's finger on the touch panel to drag the object, and touching twice a same position within a certain time to effect a double-click of mouse. If the predetermined distance is too small, the distinction from the double-click or drag is ambiguous. If the predetermined distance is too large, the input operation on the touch panel by the forefinger and the middle finger is not easy to make. If the predetermined period is too long, the input operation is not made quickly. In view of these points, the predetermined distance is set to 1 cm, for example, and the predetermined time period is set to 0.5 to 1 sec, for example. These set values may be changed in accordance with a user's preference.

The second coordinate may be apart a predetermined distance or more from the first coordinate, and the upper limit value of the distance between both the coordinates may not be specified. A direction of the second coordinate with respect to the first coordinate may not be specified, but the direction is provided with meaning to change the contents of the second processing in accordance with the direction.

The third coordinate is required to be near or at the first coordinate. The near range is regarded as the range where the input coordinate may vary because the touch position varies minutely even though the user touches the same position. Specifically, the near range corresponds to the circle with a radius of 0.5 mm having the center at the first coordinate. This setting is changed in accordance with individual circumstance of the user.

The third coordinate is required to be input within a predetermined time period from the input of the first coordinate. The predetermined time period is appropriately set up in consideration of the easier and quicker input operation, and the clear distinction from other input operations. Specifically, the predetermined time period is from 0.5 to 1 sec. This setting is changed in accordance with a user's demand.

The input of each coordinate is made by the coordinate input means capable of making the coordinate input in accordance with a touched position, and making the coordinate input of only one point at the same time. This coordinate input means may be the touch panel of pressure sensitive (resistance membrane) or capacitive coupling type.

The coordinate input means usually supplies to the information processing apparatus the information as to whether or not there is any touch and the input information regarding a coordinate input by contact in a predetermined period from the time when the touch is started till the time when it is released. The detecting means of the second type makes a positive detection in accordance with the input information, if it can be further judged that the touch is kept on from the time when the first coordinate is input till the time when the third coordinate is input.

When the detecting means of the first type is used, the first and second coordinates are easily input by touching the first and second coordinates successively by two fingers, for example, a forefinger and a middle finger, employing a coordinate input device of touch type such as a touch pad. In this case, the first processing or the second processing is selected and performed as the processing in accordance with the first coordinate easily and quickly.

When the detecting means of the second type is used, the first to third coordinates are input, employing the coordinate input means for supplying to the information processing apparatus the information as to whether or not there is any touch and the input information regarding a coordinate input by contact in a predetermined period from the time when the touch is started till the time when it is released. Thereby the first coordinate is input by a first finger, the second coordinate is input by another second finger while keeping the touch by the first finger, and then the second finger is released. And the third coordinate is input while keeping the touch by the first finger. In this way, the third coordinate is input while keeping the touch on the first coordinate.

The coordinate input means is not limited to one point type in which the coordinate of only one point can be input at the same time, but may be a multiple point type in which a plurality of coordinates can be input by touching on a plurality of points at the same time. For this multiple point type, an additional process for converting a plurality of input coordinates into the middle point or the center of gravity, if the plurality of coordinates are input at the same time may be made. In any way, the input timing of the third coordinate is coincident with the time when the second finger is released. The touch panel of multiple point type may be realized by the digital (matrix) method, optical (infrared) scan method, or surface acoustic wave method.

The coordinate input means may be a touch panel, a tablet, or a touch pad. The touch position detecting method for the coordinate input means may be a pressure sensitive (resistance membrane) method, a digital (matrix) method, an optical (infrared) scan method, a capacitive coupling method, or a surface acoustic wave method.

In the information processing apparatus according to this invention, the first processing or the second processing in accordance with the first coordinate is selectively performed depending on the presence or absence of the input of the first coordinate and the second coordinate, or the presence or absence of the third coordinate, whereby the first processing or the second processing can be easily designated and performed as the processing in accordance with the first coordinate. In this case, since the simultaneous input of the first coordinate and the second coordinate is not a requirement for making the second processing, cheap coordinate input means capable of inputting the coordinate of only one point at the same time can be employed. Accordingly, the first process comprises notifying the operating system of the same information as notifying the operating system of the computer for the information processing apparatus in case of locating the cursor at the first coordinate and pressing the left mouse button, and the second process comprises notifying the operating system of the same information as notifying the operating system in case of locating the cursor at the first coordinate and pressing the right mouse button, whereby it is possible to easily switch between the processing corresponding to the left button click of mouse and the processing corresponding to the right button click to be performed by the information processing apparatus. In the case where the detecting means of the second type is employed, there is a requirement for performing the second processing that the third coordinate is input, unlike the detecting means of the first type, whereby the input operation for performing the second processing is performed more securely without incorrect operation.

A program according to the invention that is executed on a computer comprises detecting means for detecting an input of coordinate, means for performing a first processing in accordance with a first coordinate if the detecting means does not detect the input of coordinate, and means for performing a second processing different from the first processing in accordance with the first coordinate if the detecting means detects the input of coordinate. And the detecting means makes a first type determination of detecting, within a predetermined time period after an input of a first coordinate, an another input of a second coordinate being apart a predetermined distance or more from the first coordinate, or a second type determination of detecting, within a predetermined time period after an input of a first coordinate, an input of a second coordinate being apart a predetermined distance or more from the first coordinate and the following input of a third coordinate near the first coordinate. The effect and operation and the parts are described similarly for the information processing apparatus according to the invention.

A coordinate input method according to the invention comprises a first step of inputting a first coordinate employing coordinate input means capable of making the coordinate input in accordance with a touched position to enable an information processing apparatus to perform a first processing in accordance with the first coordinate, and a second step of inputting a predetermined coordinate to enable the information processing apparatus to perform a second processing different from the first processing in accordance with the first coordinate. And the second step comprises inputting, within a predetermined time period after an input of the first coordinate for use in the second processing, a second coordinate being apart a predetermined distance or more from the first coordinate, employing the coordinate input means, or inputting, within a predetermined time period after an input of the first coordinate for use in the second processing, a second coordinate being apart a predetermined distance or more from the first coordinate, and a third coordinate near the first coordinate in this order, employing the coordinate input means.

Herein, the information processing apparatus may be appropriately the information processing apparatus according to the invention. The effect and operation with the coordinate input method according to the invention are the same as with the information processing apparatus according to the invention. The first coordinate, the second coordinate and the third coordinate for use in the second processing, and the predetermined distance, the predetermined time period, the near range, and specific embodiments are also employed in the information processing apparatus according to the invention. The specific embodiments for the input method for the first coordinate, the second coordinate and the third coordinate for use in the second processing, or the coordinate input means are applied to the information processing apparatus according to the invention.

BRIEF DESCRIPTION OF DRAWINGS

Some of the purposes of the invention having been stated, others will appear as the description proceeds, when taken in connection with the accompanying drawings, in which:

FIG. 1 is a block diagram showing a configuration of an information processing apparatus according to one embodiment of the present invention;

FIG. 2 is an explanatory view for explaining a principle of a touch panel in the information processing apparatus of FIG. 1;

FIG. 3 is a flowchart showing an information flow in the information processing apparatus of FIG. 1;

FIG. 4 is a flowchart showing a processing procedure of a device driver in the information processing apparatus of FIG. 1;

FIG. 5 is a flowchart showing another processing procedure of the device driver in the information processing apparatus of FIG. 1;

FIG. 6 is a view for explaining a principle of a touch panel of digital (matrix) method;

FIG. 7 is a view for explaining a principle of a touch panel of optical (infrared) scan method;

FIG. 8 is a view for explaining a principle of a touch panel of surface acoustic wave method; and FIG. 9 is a table listing features of the touch panel of each method that is usable in this invention.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

FIG. 1 is a block diagram showing a configuration of an information processing apparatus according to one embodiment of the present invention. As shown in FIG. 1, this apparatus comprises a digitizer portion 1 for accepting a coordinate input by the touch and outputting the input information including the input coordinate and the information as to whether or not there is any touch (contact is on or off), and a personal computer main body 2 for performing the processing in accordance with the input information. The digitizer portion 1 comprises a touch panel 3 for outputting an analog signal (voltage value) x and y corresponding to X coordinate and Y coordinate of a point touched by a finger or a pen, an AD converter 4 for converting this analog signal into a digital signal, and an interface circuit 5 for converting the input information into a signal conforming to the serial interface standards such as RS232 or USB that can be directly treated by the personal computer main body 2 in accordance with an output of the AD converter 4.

The personal computer main body 2 comprises an interface circuit 6 composed of a USB controller and an I/O controller, and a bus 8 for connecting the interface circuit 6 and the CPU 7, and accepts the input information from the interface circuit 5 via the interface circuit 6 and performs appropriate processings in accordance with the input information. The touch panel 3 is overlapped on a display screen of the personal computer main body 2, and allows the coordinate input corresponding to a display on the screen by touching on the touch panel 3.

FIG. 2 is an explanatory view for explaining a principle of the touch panel 3. The touch panel 3 is a pressure sensitive (resistance membrane) touch panel having two sheets of transparent electrode (resistance membrane) 21 and 22, as shown in FIG. 2. The transparent electrodes 21 and 22 are opposed with a void, and do not conduct when there is no contact, but if a transparent electrode 21 is touched by a finger or a pen, the transparent electrode 21 connects to a transparent electrode 22 at a touched point, so that both electrodes are placed in a conducting state. At this time, a voltage between the Y-direction ends 22a and 22b of the transparent electrode 22 can be output as a signal y corresponding to a touched position in the Y-direction by applying a constant voltage between the X-direction ends 21a and 21b of the transparent electrode 21. Also, a voltage between the X-direction ends 21a and 21b of the transparent electrode 21 can be output as a signal x corresponding to a touched position in the X-direction by applying a constant voltage between the Y-direction ends 22a and 22b of the transparent electrode 22.

When two points are touched at the same time, an intermediate voltage between the voltages produced when two points are touched separately is produced across the X-direction ends 21a and 21b, and across the Y-direction ends 22a and 22b, respectively, whereby signals x and y are output as a level corresponding to a middle point of two points touched. Accordingly, the coordinate of each point can not be input, but only one middle point is input, even if two points are touched at the same time. However, the output signals x and y are analog quantities that vary continuously, corresponding to the touched position, with a high resolution of the touched position.

The digitizer portion 1 outputs the input information including the information regarding the input coordinate from the touch panel 3 obtained in the above way, and the information as to whether the touch panel 3 is contacted (on) or not (off), to the personal computer main body 2 from the initial time of contact till the time when the contact is released. The personal computer main body 2 can know the touched condition at present, and the input coordinate, if touched, in accordance with the input information successively input.

The OS (Operating System) of the personal computer main body 2 cooperates with a device driver for enabling access to the digitizer portion 1. As shown in FIG. 3, the input information from the digitizer portion 1 is converted into the information corresponding to an operation of the mouse by the device driver 32, and passed to the OS 33. In accordance with this information, the OS 33 passes a mouse event indicating the movement of mouse cursor or click to an application software 34.

FIG. 4 is a flowchart showing the processing procedure of the device driver. A controller of the digitizer portion 1 sends to the device driver the input information periodically from the time when the touch panel 3 is initially touched by a finger till the time when the touch panel 3 is not touched by the finger, whereby the device driver performs a process of FIG. 4 by interruption every time of receiving the input information. When the touch panel 3 is not touched by the finger, the process of FIG. 4 is not performed.

That is, at step S1, a determination is made whether or not the finger is kept away from the touch panel 3. When the contact is off in the input information, it is determined that the finger is kept away. If it is determined that the finger is kept away, the flags 1 and 2 are reset at step S8, and the procedure transfers to step S11 to perform an ordinary processing. In this case, the ordinary processing involves notifying the OS of the same data as that notified to the OS when the initially touched input coordinate (hereinafter referred to as a "first coordinate") saved previously at step S9 (described later) is clicked by pressing the left mouse button, for example.

If it is determined that the finger is not kept away from the touch panel at step S1, the procedure goes to step S2, where a determination is made whether the touch panel is now touched or continues to be touched. Namely, if the flag 1 indicating the continuous contact is off, and the contact is on, it is determined that the touch panel is now touched, but if the flag 1 is on, and the contact is on, it is determined that the touch panel continues to be touched. In the case where it is determined that the touch panel is now touched, the flag 1 is set, and the input coordinate (first coordinate) indicated by the input information is saved as the initially touched position along with the present time at step S9. Thereafter, the procedure transfers to step S11 to perform the ordinary process. In this case, the ordinary process involves notifying the OS of the data for moving the cursor to the input coordinate indicated by the input information, for example.

If it is determined that the touch panel continues to be touched at step S2, the procedure goes to step S3, where a determination is made whether or not the lapse time from the start of contact is within Dt. The lapse time can be obtained from the time saved at step S9 at the initial contact and the present time. If it is determined that the lapse time is not within Dt, the procedure transfers to step S11 to perform the ordinary process. In this case, the ordinary process involves notifying the OS of the data for moving the cursor to the input coordinate indicated by the input information, for example. Also, Dt is set to a value from 0.5 to 1 second, for example. If it is determined that the lapse time is within Dt at step S3, the procedure transfers to step S4 to determine whether or not the distance between the initially touched position (first coordinate) saved at step S9 at the initial contact and the current position (input coordinate) is greater than W1 and smaller than W2. If it is determined that this distance is greater than W1 and smaller than W2, the flag 2 is set at step S10. Then, the procedure transfers to step S11 to perform the ordinary process. Namely, if the flag 2 is on, it is indicated that the touch is kept on after the first coordinate is input, and the coordinate W1 or more away from the first coordinate is newly input within the time Dt from the input of the first coordinate. The new input coordinate (hereinafter referred to as a "second coordinate") is at a middle point between the first coordinate and the touched position. In this case, the ordinary process at step S11 involves notifying the OS of the data for moving the cursor to the second coordinate, for example. The value of W1 corresponds to 1 cm, for example. There is no restriction by W2.

If it is determined at step S4 that the distance between the initially touched position and the current position is not "greater than W1 and smaller than W2", the procedure transfers to step S5 to determine whether or not the flag 2 is set. At this time, if the flag 2 is on, it is meant that the touch on the first coordinate is continued, the position corresponding to the second coordinate W1 or more off is touched within the time Δt from the initial contact, and then the contact is released. If it is determined that the flag 2 is not set, the procedure transfers to step S11 to perform the ordinary process. In this case, the ordinary process involves notifying the OS of the data for moving the cursor to the input coordinate indicated by the input information, for example.

If it is determined at step S5 that the flag 2 is set, the procedure transfers to step S6 to determine whether or not the distance between the initially touched position saved at step S9 and the current position is smaller than W3. The value of W3 is set to 0.5 mm, for example. If it is determined that the distance is not smaller than W3, the procedure transfers to step S11 to perform the ordinary process. In this case, the ordinary process involves notifying the OS of the data for moving the cursor to the input coordinate indicated by the input information, for example.

If it is determined at step S6 that the distance between the initially touched position and the current position is smaller than W3, that is, the input coordinate indicated by the input information is within the radius W3 from the first coordinate, the third coordinate is input and the procedure transfers to step S7. At step S7, the same data as notified to the OS in making the right button click of mouse is reported to the OS. In this case, the initially touched position (first coordinate) saved at step S9 is clicked. Thereafter, the OS supplies a mouse event to an active application software in accordance with this report. This application software makes a processing in case of clicking on the first coordinate with the right mouse button in accordance with this mouse event.

In accordance with this embodiment, if the second coordinate over the distance W1 off the first coordinate is input within the time Dt since the input of the first coordinate, and thereafter the third coordinate W3 or less off the first coordinate is input, the data corresponding to the right button click of mouse is reported to the OS. Thereby, only by touching a desired icon on the screen by a forefinger and tapping another position by a middle finger, it is possible to make an operation equivalent to the right button click of mouse for that icon.

In this embodiment, the touch panel 3 is a pressure sensitive touch panel capable of making the coordinate input of only one point at the same time, but when there are a plurality of coordinates input at the same time, the touch panel 3 may be capable of inputting the plurality of coordinates at the same time, if a step of converting the input coordinates into one point coordinate of their middle point or center of gravity is additionally provided.

FIG. 5 is a flowchart showing another example of the processing procedure with the device driver 32. The processing contents at steps S51 to S58 are the same as those at steps S1 to S4, S7 to S9 and S11 in FIG. 4, respectively. That is, the process of FIG. 5 has none of the steps S5, S6 and S10 in the process of FIG. 4. Accordingly, in the process of FIG. 4, under the requirement that after the input of the second coordinate is detected at step S4, and the flag 2 is set, the position (third coordinate) near the initially touched position is detected, the data is reported to the OS at step S7. However, in the process of FIG. 5, if the input of the second coordinate is detected at step S54, the procedure directly transfers to step S55 to report the data corresponding to the right button click to the OS. Thereby, there is attained the same effect as with the processing procedure of FIG. 4.

In the processing procedure of FIG. 5, the duration of contact at step S52 is the requirement for step S55 to report the data to the OS. However, this requirement may be released and the data may be reported to the OS at step S55 in the case where the second coordinate is input within the time Dt after the input of the first coordinate, irrespective of whether or not the touch is kept on from the time when the first coordinate is input. Thereby, the second coordinate may be input without keeping the touch on the first coordinate, whereby the input operation is simplified.

In the above embodiment, the touch panel 3 is pressure sensitive, but alternatively may be of other methods including digital (matrix) method, optical (infrared) scan method, capacitive coupling method, and surface acoustic wave method.

The touch panel of the digital (matrix) method has a plurality of strip transparent electrodes 61 and a plurality of strip transparent electrodes 62 arranged in the X and Y directions, respectively, as shown in FIG. 6. The transparent electrodes 61 and 62 are opposed via a void, and if a position is touched, any transparent electrodes 61 and 62 corresponding to its position conduct. The touched position can be detected by sequentially scanning the transparent electrodes 61 and 62 to examine which transparent electrodes 61 and 62 conduct. The resolution of the touched point depends on the number of transparent electrodes 61 and 62, and is lower than with the pressure sensitive method. Theoretically, a plurality of touched positions can be detected at the same time, but the number of positions detectable at the same time depends on the specification of the controller in use. The calibration is unnecessary.

The touch panel of optical (infrared) scan method has a number of light emitters 71 and light sensors 72 in pairs arranged in the X and Y directions, respectively, as shown in FIG. 7. The light sensors 72 detect the position at which a light emitted from the light emitters 71 is intercepted by the finger or pen, whereby the touched position by the finger or pen is detected, and output. The resolution of the touched point depends on the number of light emitters 71 and light sensors 72, and is lower than with the pressure sensitive method. Theoretically, a plurality of touched positions can be detected at the same time, but usually, the first touched position is only detected. The number of positions detectable at the same time depends on the specification of the controller in use. The calibration is unnecessary. The operation is not affected by a flaw on the surface of the panel.

The touch panel of capacitive coupling method has a structure in which a conductive film is formed on the surface of the panel, and electrodes are arranged peripherally. If a uniform electric field is produced on the conductive film from the peripheral electrodes, a current flows to disorder the electric field, when a finger or a special pen touches the panel surface. The touch position can be calculated in accordance with this current. This touch panel has a high transparency of panel and a high resolution, but when two points are touched at the same time, their middle point is recognized as the touched point. With this method, there is no need of deforming the electrode to make contact and recognize the touched point, unlike a pressure sensitive or digital method, there is less force for touching the panel, and the touched point can be recognized only by touching slightly the surface. To flow a current through the surface, a special pen may be needed. When the panel is touched, it is necessary to use a bare finger.

The touch panel of surface acoustic wave method comprises a ultrasonic (surface acoustic wave) oscillator 81 and a receiver 82, a reflection array 83 for reflecting the ultrasonic wave emitted by the oscillator 81, and a reflection array 84 for reflecting the ultrasonic wave reflected from the reflection array 83 toward the receiver 82, as shown in FIG. 8. In FIG. 8, a component for detecting the touched position in the X-direction is illustrated, but the component may be rotated 90 degrees for detecting the touched position in the Y-direction. The ultrasonic wave emitted from the oscillator 81 is reflected in the Y or X direction by the reflection array 83, travels along the panel surface, reflected by the reflection array 83, and received by the receiver 82, but because the distance of transmission path is different depending on the reflection position of the reflection array 83, 84, the ultrasonic wave arrives at the receiver 82 with a certain temporal breadth. At this time, the ultrasonic wave travels uniformly over the entire surface of the panel in a non-touched state, whereby the strength of ultrasonic wave incident upon the receiver 82 is constant over time. However, if there is any touched point by the pen or finger halfway, the transmission of ultrasonic wave through that position is delayed, so that the receiving strength at the time corresponding to that position is lowered. Accordingly, the controller for the touch panel can calculate the coordinate of touched position in accordance with the time when the receiving strength is lowered. This touch panel has a high transparency of the panel and a high resolution of the input coordinate. Furthermore, this touch panel allows a plurality of coordinates to be input at the same time. However, usually, the coordinate input of the firstly touched position is only accepted. The number of positions that can be input at the same time depends on the specification of the controller. A special pen having a high absorptivity of ultrasonic wave is required for input.

Each method of the touch panel has the features as listed in table 9.

In the drawings and specifications there has been set forth a preferred embodiment of the invention and, although specific terms are used, the description thus given uses terminology in a generic and descriptive sense only and not for purposes of limitation.

What is claimed is:

1. An information processing apparatus comprising:
   a unit for detecting a first touch at a first coordinate and, within a predetermined time period after said first touch, a second touch at a second coordinate being apart a predetermined distance or more from said first coordinate, and following said second touch, a third touch at a third coordinate near said first coordinate;
   a unit for performing a first processing in accordance with said first coordinate if said detecting unit does not detect said third touch at said third coordinate; and
   a unit for performing a second processing different from said first processing in accordance with said first coordinate, if said detecting unit detects said third touch at said third coordinate.

2. The information processing apparatus according to claim 1, wherein said information processing apparatus comprises a computer, in which said first processing comprises notifying an operating system of the same information as notifying said operating system of said computer at the time of locating a cursor at said first coordinate and pressing a left mouse button, and said second processing comprises notifying said operating system of the same information as notifying said operating system at the time of locating the cursor at said first coordinate and pressing a right mouse button.

3. The information processing apparatus according to claim 1, wherein an input of each coordinate is performed by a coordinate input unit capable of making a coordinate input in accordance with a touched position and making the coordinate input of only one point at the same time.

4. The information processing apparatus according to claim 3, wherein said coordinate input unit supplies to said information processing apparatus the information as to whether or not there is any touch and the input information regarding a coordinate input by contact in a predetermined period from the time when the touch is started till the time when the touch is released, and said detecting means makes a positive detection in accordance with said input information, if it can be further judged that the touch is kept on from the time when said first coordinate is input till the time when said third coordinate is input.

5. The information processing apparatus according to claim 1, wherein said third coordinate is input by keeping the first touch for inputting said first coordinate.

6. A computer program residing on a computer-readable medium, comprising instructions causing a computer to:
  detect a first touch at a first coordinate;
  detect within a predetermined time period after said first touch, a second touch at a second coordinate being apart a predetermined distance or more from said first coordinate and a third touch at a third coordinate near said first coordinate;
  perform a first processing in accordance with said first coordinate if said third touch is not detected; and
  perform a second processing different from said first processing in accordance with said first coordinate, if said third touch is detected.

7. The program according to claim 6, wherein said first processing comprises notifying an operating system of the same information as notifying said operating system of said computer at the time of locating a cursor at said first coordinate and pressing a left mouse button, and said second processing comprises notifying said operating system of the same information as notifying said operating system at the time of locating the cursor at said first coordinate and pressing a right mouse button.

8. The program according to claim 6, wherein an input of each coordinate is performed by a coordinate input unit capable of making a coordinate input in accordance with a touched position and making the coordinate input of only one point at the same time.

9. The program according to claim 8, wherein said coordinate input means supplies to said computer the information as to whether or not there is any touch and the input information regarding a coordinate input by contact in a predetermined period from the time when the touch is started till the time when it is released, and said detecting means makes said positive detection in accordance with said input information, if it can be further judged that the touch is kept on from the time when said first coordinate is input till the time when said third coordinate is input.

10. The information processing apparatus according to claim 6, wherein said third coordinate is input by keeping the first touch for inputting said first coordinate.

11. A coordinate input method comprising:
  touching a coordinate input unit a first time to input a first coordinate, wherein the coordinate inputunit is capable of making the coordinate input in accordance with a touched position to enable an information processing apparatus to perform a first processing in accordance with said first coordinate; and
  touching the coordinate input unit a second time to input, within a predetermined time period after an input of said first coordinate, a second coordinate being apart a predetermined distance or more from said first coordinate; and
  touching the coordinate input unit a third time to input a third coordinate near said first coordinate in this order, employing said coordinate input unit, to enable said information processing apparatus to perform a second processing different from said first processing in accordance with said first coordinate.

12. The coordinate input method according to claim 11, wherein said coordinate input unit supplies to said information processing apparatus the information as to whether or not there is any touch and the input information regarding a coordinate input by contact in a predetermined period, and said first to third coordinates are input in such a manner that said first coordinate is touched by a first finger, said second coordinate is touched by another second finger while keeping the touch by the first finger, and after said second finger is released, said third coordinate is touched by said second finger while keeping the touch by the first finger.

13. The coordinate input method according to claim 11, wherein said coordinate input unit can make the coordinate input for only one point at the same time.

* * * * *